(12) United States Patent
Van Gorp

(10) Patent No.: US 6,503,041 B2
(45) Date of Patent: Jan. 7, 2003

(54) BULK HANDLING APPARATUS

(76) Inventor: Keith Van Gorp, 5-7 Avery Court, Greenbank, Brisbane QLD 4124 (AU)

(*) Notice: Subject to any disclaimer, the term of this patent is extended or adjusted under 35 U.S.C. 154(b) by 0 days.

(21) Appl. No.: 09/798,850

(22) Filed: Mar. 2, 2001

(65) Prior Publication Data

US 2001/0008604 A1 Jul. 19, 2001

Related U.S. Application Data

(63) Continuation-in-part of application No. PCT/AU99/00747, filed on Sep. 9, 1999.

(51) Int. Cl.[7] .................................................. E04H 7/22
(52) U.S. Cl. ........................................ 414/293; 414/301
(58) Field of Search ................................ 414/287, 293, 414/300, 301

(56) References Cited

U.S. PATENT DOCUMENTS

| | | | | |
|---|---|---|---|---|
| 3,358,856 A | * | 12/1967 | Weibull | 414/298 |
| 3,592,447 A | * | 7/1971 | Steffen | 366/186 |
| 3,800,964 A | * | 4/1974 | Patterson | 414/287 |
| 4,033,466 A | * | 7/1977 | Easton | 414/301 |
| 4,052,108 A | * | 10/1977 | Weaver et al. | 406/161 |
| 4,721,425 A | * | 1/1988 | Strocker | 222/523 |
| 4,794,865 A | * | 1/1989 | Lindberg | 104/109 |
| 5,238,087 A | * | 8/1993 | Garrido et al. | 187/17 |

* cited by examiner

*Primary Examiner*—Kathy Matecki
*Assistant Examiner*—Charles A. Fox
(74) *Attorney, Agent, or Firm*—Donald J. Ersler

(57) ABSTRACT

A storage apparatus suitable for storing granular material in a large tank-like storage container into which material is introduced from an material inlet at a top of the storage container to pile up in a normal manner. A height adjustable leveling apparatus in the form of a rotary scraper is supported within the storage container which engages the uppermost portion of the heaped material and spreads it for leveling the upper surface of the material. Whereby the storage container may be filled to an upper level surface maximizing the useful volume of the storage container. Discharge from a central or peripheral port is likewise maximized by ensuring all material in the container to the discharge level is fed for reclamation.

16 Claims, 13 Drawing Sheets

BULK HANDLING APPARATUS

CROSS-REFERENCES TO RELATED APPLICATIONS

This is a continuation-in-part application taking priority from PCT patent application serial number PCT/AU99/00747 filed on Sep. 9, 1999.

BACKGROUND OF THE INVENTION

1. Field of the Invention

The present invention relates generally to bulk handling apparatus and in particular to storage apparatus for storing bulk granular materials.

2. Discussion of the Prior Art

Bulk granular materials are typically stored in silos or large sheds. Silos are mostly utilized for storing grain and reclaiming is achieved through a base cone arranged coincident with the repose angle of the grain such that all material will feed gravitationally to a central outlet for discharge from the silo. A disadvantage of this arrangement is that such silos are relatively high and this necessitates additional cost and complexity for equipment to feed grain into the silos.

Mined bulk granular material is often stored in sheds where it may be deposited, for example, by a central conveyor supported in the apex of a conventional portal frame shed. Reclaiming of the product is achieved using front end loaders charging dump hoppers travelling over an out-load conveyor which may be arranged in a tunnel and fed from a central point. Capital costs of such designs are very high and large land areas are required for such storage. Additionally, there is an ongoing reclaim cost necessitated by the use of supervised machinery to reclaim the material from the shed.

A further disadvantage of these systems is that many bulk solids have properties that will allow the forming of ratholing and make those materials bridge over an out-loading point thereby stopping the exit flow of materials. The problem of bridging and rat-holing may become extreme in cases where material has been in static storage for a considerable period of time thereby having allowed gravitational pressures to cause settlement or compaction of what may have been a relatively freeflowing material.

Hydroscopic properties of some materials will allow them to become sticky in storage adding further to the problems of extracting such materials from silo type storage. Mined bulk granular material is also stored as open stockpiles serviced by rail mounted stacker reclaiming machinery. Disadvantages of such systems include the high cost of stockpiling and management with regard to the environment and high maintenance costs of the necessary equipment for stockpiling and reclaiming.

The present invention aims to alleviate at least one of the above disadvantages and to provide storage apparatus which will be reliable and efficient in use.

SUMMARY OF THE INVENTION

With the foregoing and other objects in view, this invention in one aspect resides broadly in storage apparatus suitable for storing granular material. The storage apparatus includes a storage container, a material inlet at the top of the storage container, a material outlet at the base of the storage container, and a height adjustable leveling apparatus for leveling the upper surface of material contained in the storage container. Thus the upper surface may be levelled to enable the container to be filled to capacity when filling, and when discharging to level the upper surface to ensure complete discharge of all materials as the container is emptied from the base.

The leveling apparatus could be any suitable form of conveying apparatus which conveys the material being fed into the container towards the outside of the container when filling and when emptying which conveys the material remaining about the periphery of the container towards the center of gravitational; discharge at the base.

In a preferred embodiment, the leveling apparatus is in the form of a driven rotary scraper rotatable about a vertical axis and having an overall diameter substantially equal to the inside diameter of the container, the scraper having blades thereon engagable with the upper surface of material in the container so as to move the engaged material selectively inward or outward as required. For this purpose, the blades may be fixed or adjustable and the wheel may be reversible to control the direction of feed of the granular material.

Alternatively, the vanes may be reversible or the scraper may include alternate sets which may be lowered for engagement with the granular material. Preferably the rotary scraper includes an outer ring frame supported on vertically adjustable mountings on or adjacent the container wall. It is also preferred that for the best mechanical advantage, the drive apparatus for selectively rotating the wheel are mounted on the vertically adjustable mountings and drive the outer ring frame. The drive motor may drive a pinion engaged with an annular rack on the ring frame. Alternatively, the rotary scraper may be supported from a central column and drive therefrom. However this would impose complexities and high loads due to the need to transmit high operating torque through the column to an inner ring of the rotary scraper.

This invention may also be applied to reclaiming materials from an unsupported pile. Thus according to another aspect this invention resides broadly in a method of and apparatus for reclaiming material from a stockpile of granular material including: providing a height adjustable spreading apparatus for spreading material from the upper surface of the stockpile outwardly for passage to the base of the stockpile; providing reclaiming apparatus at the base of the stockpile, and operating the spreading apparatus to cause feeding of that material in the stockpile which does not initially flow gravitationally to the reclaiming apparatus toward the base of the remaining stockpile to enable feeding of substantially all the material in the stockpile reclaiming apparatus. The stockpile may be supported on a base pad containing the reclaiming apparatus and, if desired, the stockpile may be contained within a peripheral wall. In a further aspect this invention may utilize open stockpile arrangements suitable for storing and or blending granular bulk solids and including: a circular storage or blending area; material outlet port or ports positioned on the storage area centerline at the base of the storage area; peripherally positioned supporting towers providing support for the height adjustable leveling-reclaiming apparatus; a centrally positioned support column and distribution means and the leveling apparatus generally as described earlier, may be supported in a peripheral annular support truss, this support truss in turn may be supported via the provision of a series of cabled sheaves and counterweights arrangements at the peripheral support towers.

The counterweight and cable and sheave system will be arranged to create a balance of mass between the leveling apparatus and the counterweights. Such a design requires only limited force to promote the up or down movement of the leveling/reclaiming apparatus The design of the counterweight sheave system will ensure that limited travel of the counterweights will enable the leveling apparatus to traverse the full operational height of the stockpile.

The leveling apparatus may then be directed up or down by simple mechanical means positioned at the base of each of the support towers. When applying the foregoing to a very large diameter stockpile additional support for the leveling apparatus may be provided at the inner hub of the leveling apparatus.

An inner annular truss providing support to the leveling apparatus may be counter balanced by a cable sheave and counterweight arrangement housed inside the hollow center support column. A single mechanical raising and lowering arrangement such as for instance a hydraulic ram may be selected to effect the required up and down travel of the leveling apparatus.

The leveling apparatus in the open stockpile application suitably has the scraper blades positioned in such a way so as to have the blades on the underside of the inner section of the leveling apparatus scrape the material outward to a position coincident with the top of the repose angle of the material stored. The rest of the scraper blades on the outer section of the leveling apparatus are positioned opposite to provide the outer part of the apparatus with inward scraping blades. These scraper blade positions ensure that the stockpile can be totally reclaimed of all stockpiled material. It follows that the reclaim ports should be positioned under the stockpile coincident with a position vertically down from the top of the repose angle at the top of the stockpile.

Driving of the leveling apparatus in the open application may be by means of a friction drive as described earlier but with the motor/gearbox or hydraulic drive pack drive units positioned at three equi-spaced points at the periphery on the leveling-reclaiming apparatus and having electric power supplied via a slipring arrangement at the center hub. Actual friction drive power is suitably applied at the outer annular support truss, this support truss is slideably attached to the perimeter support towers and supported by a series of counterweights inside the support tower structures. The support towers serve as the reaction columns for the drivers.

Operation of the leveling apparatus may be determined so as to have the apparatus, while the stockpile is in charging mode, rotating at its top position this will allow the incoming material to form a pile around the center column. This pile is embraced by the angle of repose of the material stored.

With only the material at the top of the pile being bladed outward, different grades of material may be added to the stockpile thus forming within the parameters of the installation an ever widening frustum pile consisting of several grades of material. Materials may be added to the stockpile until the base area of the stockpile is fully utilized. Reclaiming action of the leveling apparatus will reclaim layers of the varying grades of material, while in the process, blending the different grades into a new homogenous material composed of percentages of the grades that make up the stockpile.

The open stockpile management system may of course be enclosed with a lightweight low cost metal clad type structure providing weather or environmental protection should this at any time become necessary or desirable.

The reclaiming method and apparatus of this invention may be used to advantage with conventional silos and constitutes a further invention.

DETAILED DESCRIPTION OF THE PREFERRED EMBODIMENTS

Figure 1:
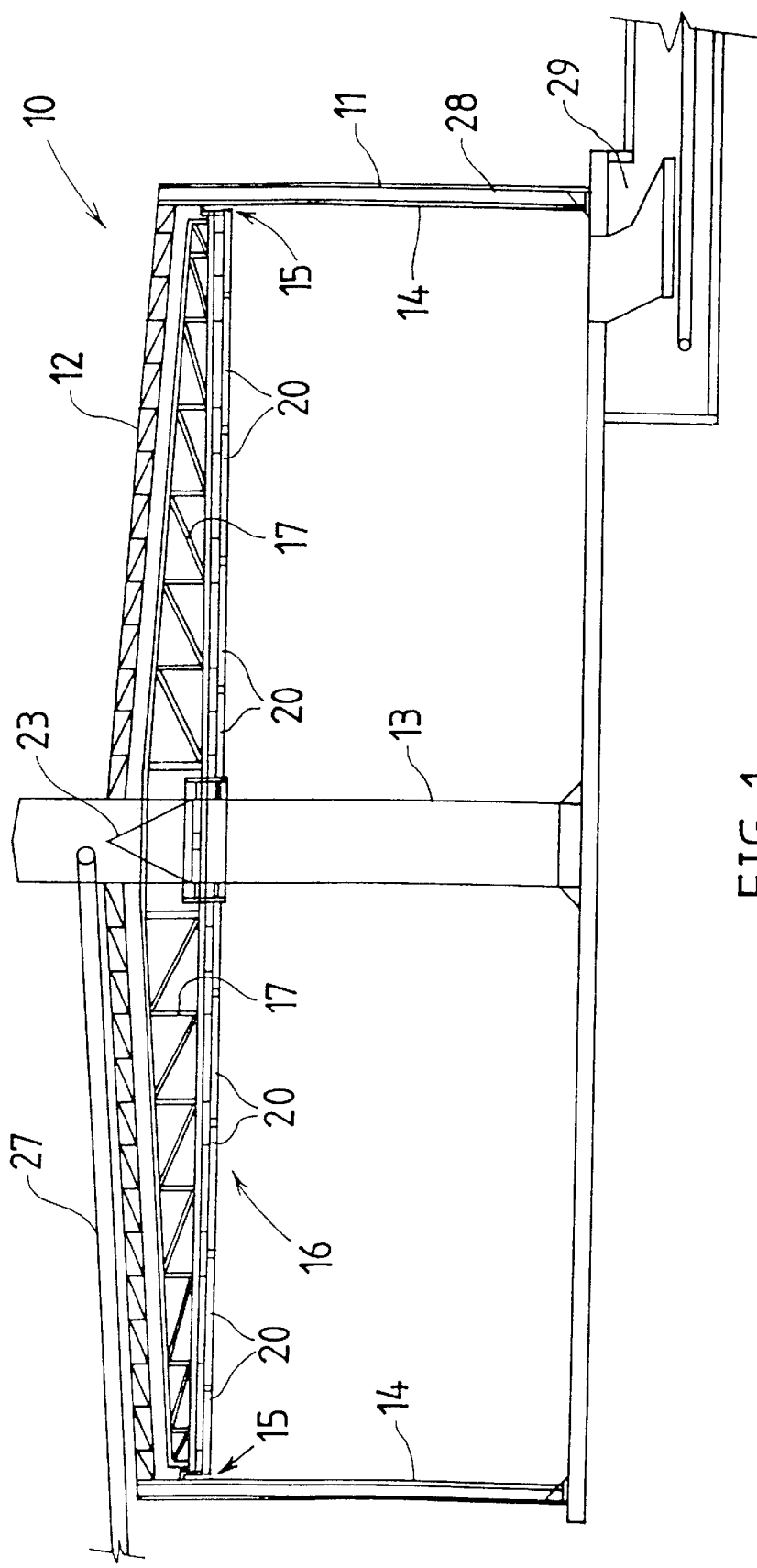
FIG. 1 is a side view of a storage facility made in accordance with one aspect of this invention and shown partly cut-away.

The storage apparatus 10 is in the form of a low profile container 11 having a low pitched roof 12 supported by a container wall 28 and centrally by a large diameter central column 13. A series of guide post assemblies 14 are arranged vertically about the inside periphery of the container 11 and rotary support apparatus 15 are engaged with the post assemblies 14 for vertical movement along the posts and support of the peripheral edge of the rotary scraper 16. The material is introduced over a spreading cone 23 from a feed conveyor 27 and discharged from a peripheral reclaiming chamber 29 adjacent the container wall 28.

Figure 2:
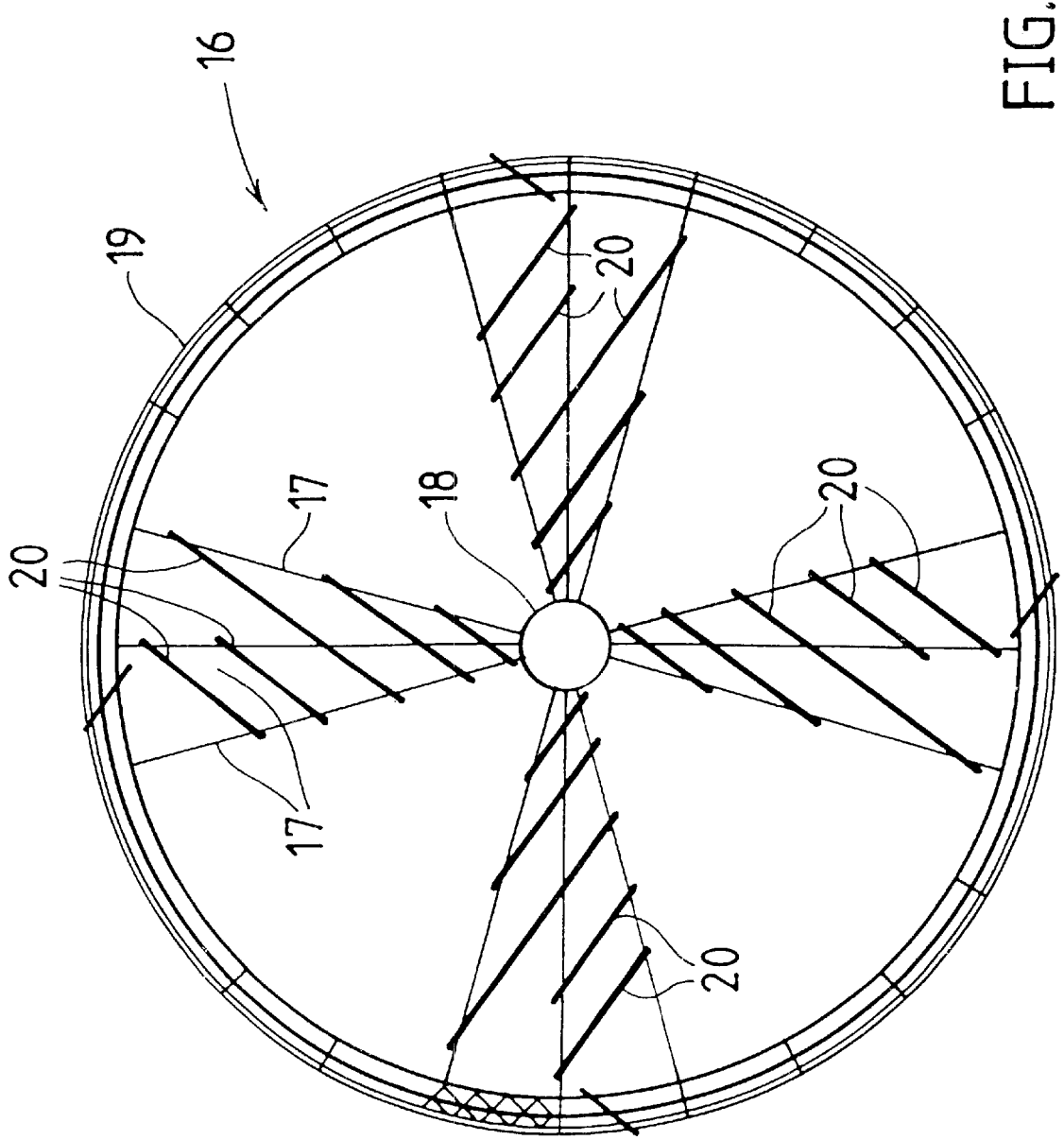
FIG. 2 is a plan view of one form of a rotary scraper assembly.

In the illustrated embodiment, the container is an eighty meter diameter container with a wall height of about 20 meters and is adapted to contain about 80,000 tons of mined or manufactured granular material, such as bauxite or map dap fertilizer. The rotary scraper 16 illustrated in FIG. 2 has a series of radial arms 17 which extend from an inner annular hub 18 to an outer annular rim 19 which support scraper blades 20 in a suitable arrangement thereon. The blades 20 extend downwardly from the underside of the arms 17 so as to engage the top surface of material contained in container 11.

Figure 4:
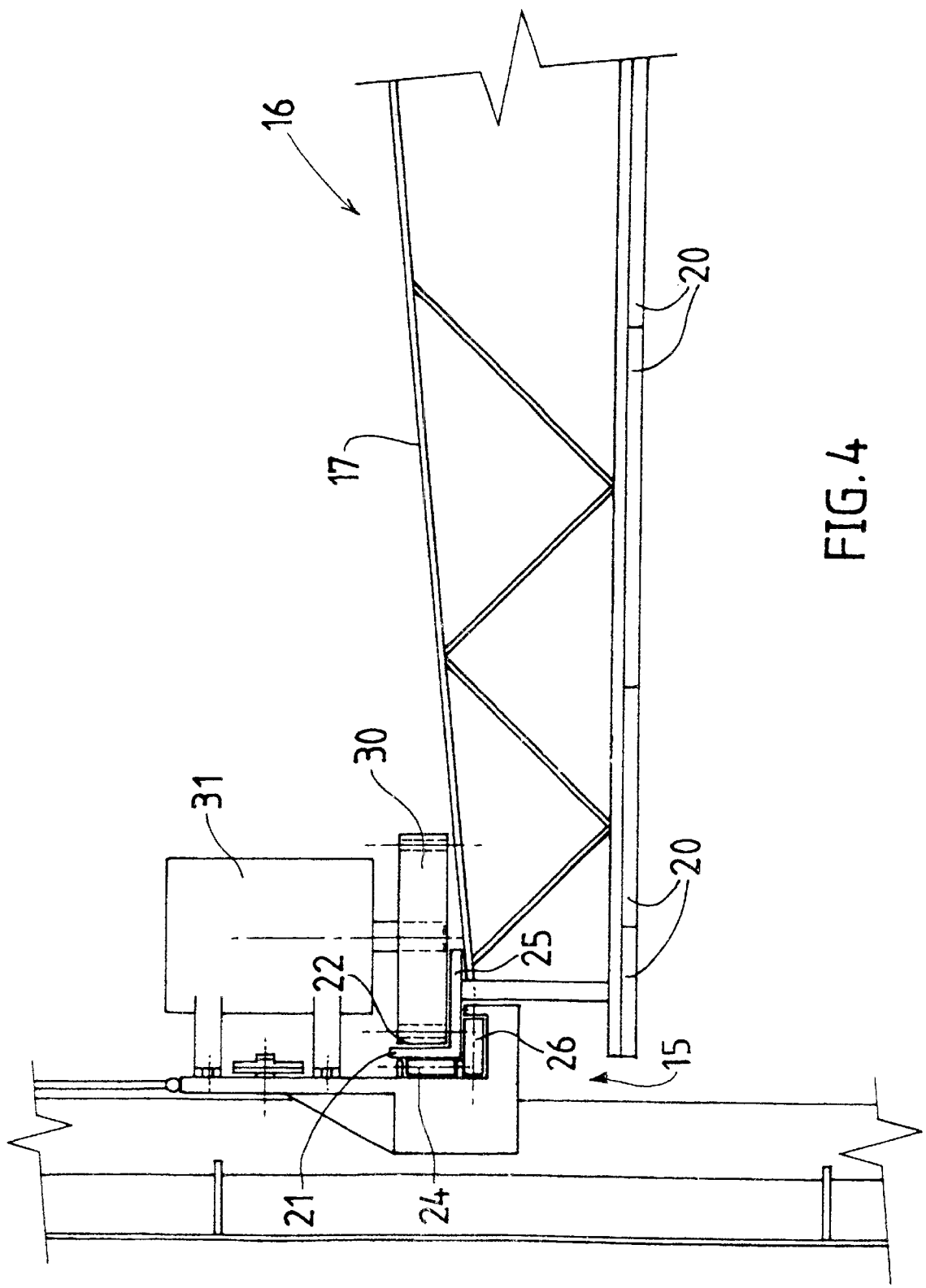
FIG. 4 illustrates the peripheral support mechanism for the rotary scraper.

As illustrated in FIG. 4, the outer rim 19 includes an angle section member 21 having a vertical web which provides radial location against the centering rollers 24 supported by the rotary support apparatus 15 and a horizontal web 25 providing vertical support on the horizontal centering rollers 26. Both the rollers 24 and 26 are arranged for free rotation about their respective axes and are supported on each rotary support apparatus 15.

Figure 3:
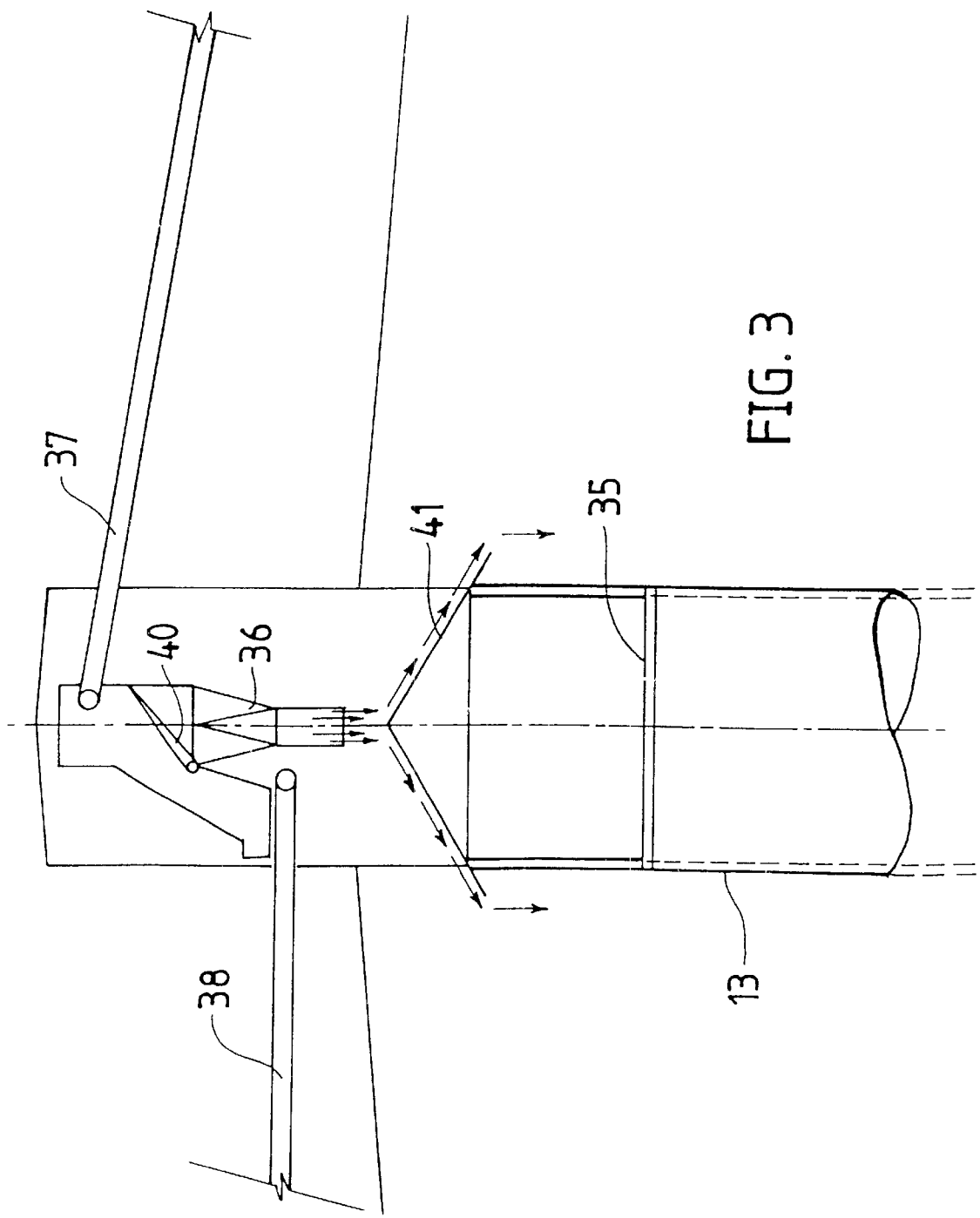
FIG. 3 is a part sectional view showing the upper loading details of a storage container.

The inner face of the vertical web 22 is also formed as an annular gear which meshes with a driven gear 30 mounted directly on the output shaft of a motor/gearbox assembly 31 mounted on the rotary support apparatus 15. In order to resist the torque applied to the rotary support apparatus 15 by the drive motor 31, each guidepost assembly 14 includes spaced apart posts between which the rotary support apparatus 15 engages. Each rotary support apparatus 15 is suspended from the upper edge of the container by a remotely operated hoist, all of which are operated simultaneously so that the rotary scraper 16 can be raised and lowered to a selected position. The inner hub 18 rotates freely about the central column 13. FIG. 3 illustrates the central column 13 extending upwardly to provide an equipment deck 35 adjacent the roof and upwardly therebeyond to support the roof and to support the discharge chute 36 and upper end of the loading conveyor 37. If desired, a transfer conveyor 38 may also be supported to take the product to an adjacent storage facility once the container is full. A flap valve 40 is provided for directing the flow either to the transfer conveyor 38 or the discharge chute 36 for discharge upon a cone shaped spreader cap 41 from which granular material flows into the container.

Figure 5:
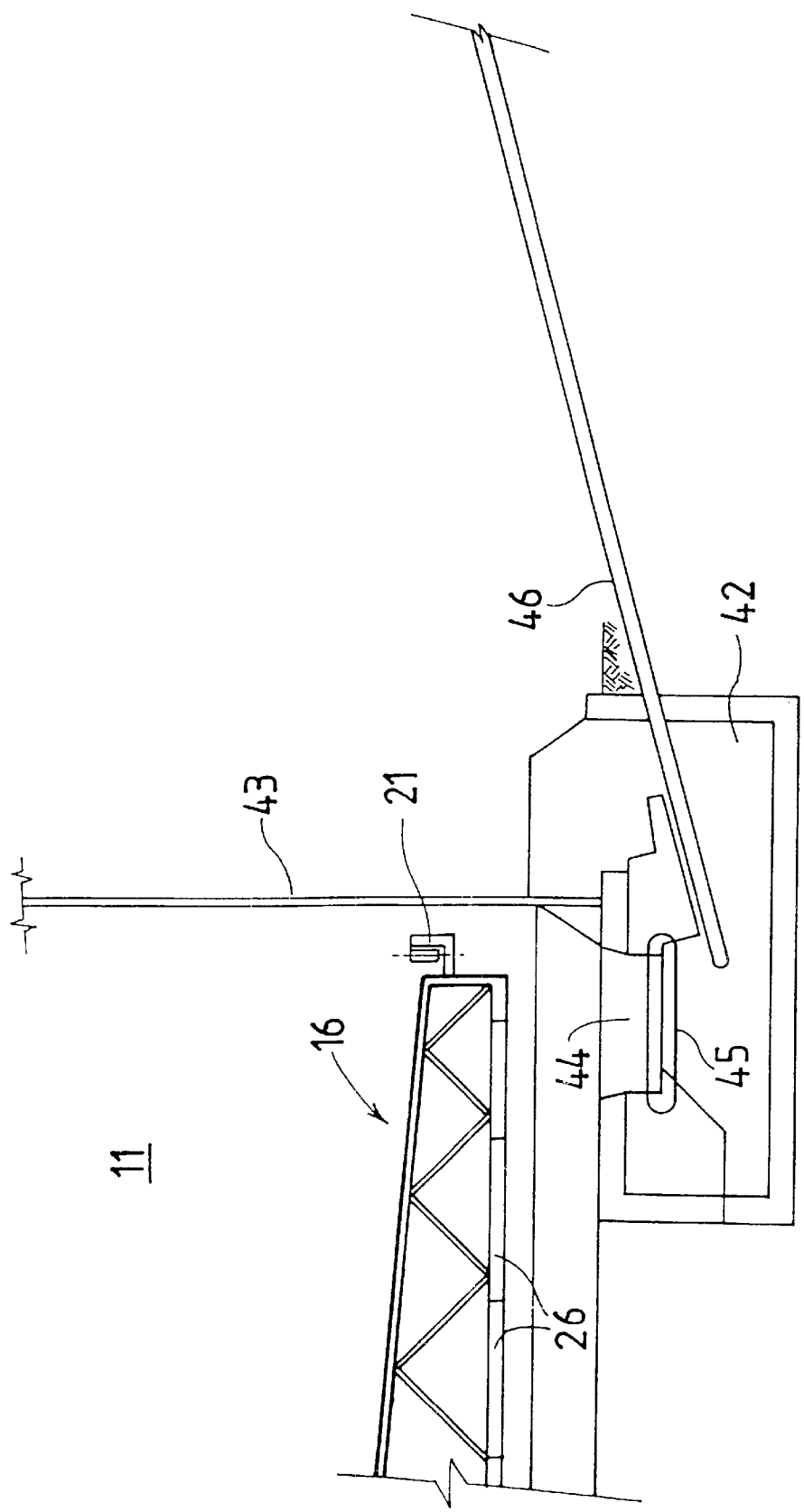
FIG. 5 illustrates an alternate form of peripheral reclaiming apparatus for reclaiming material from a storage container.

As shown in FIG. 5, discharge from the base of the container 11 is achieved through a reclaiming chamber 42 adjacent the sidewall 43 of the container 11. A first belt-type 45 conveyor or feeder unit transfers material falling through the inlet 44 to an outloading conveyor 46 which elevates the material to a desired delivery station.

Figure 6:
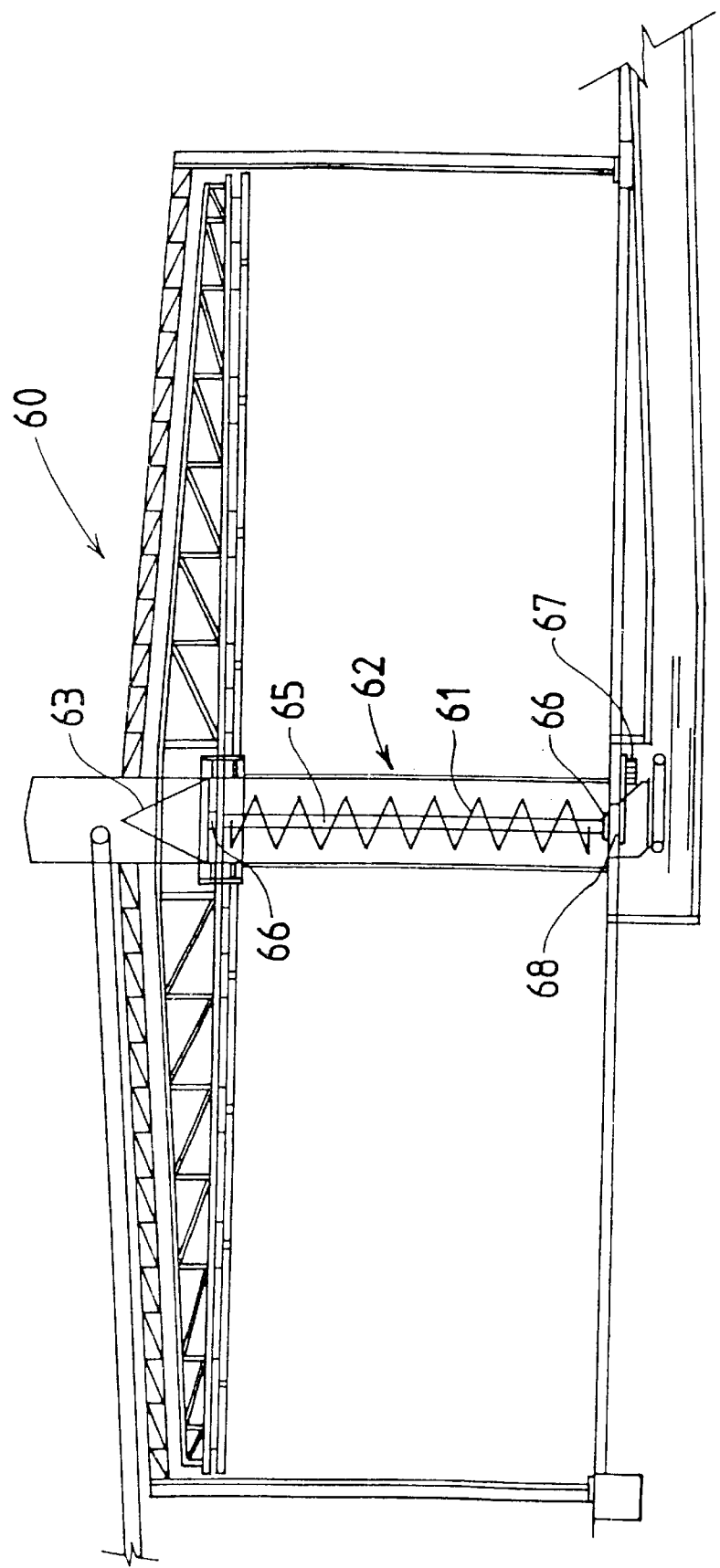
FIG. 6 is a cut-away side view of an alternate form of storage facility utilizing a central material discharge.

The storage apparatus 60 illustrated in FIG. 6 utilizes a centrally arranged auger 61 disposed within the central open structure column 62 about which material to be stored is introduced via a distribution cone 63 adjacent the column structure 62. The auger 61 has a center shaft 65 supported by bearings 66 at its ends, and where so dictated by engineering design at suitable intermediate positions along its center shaft 65. The bearings 66 allow the auger to rotate about its axis. The auger 61 is belt or chain driven by an electric motor 67 which is positioned adjacent the lower bearing 66 for suitable maintenance or service access away from the discharge port 68 at the base of the auger 61.

Figure 7:
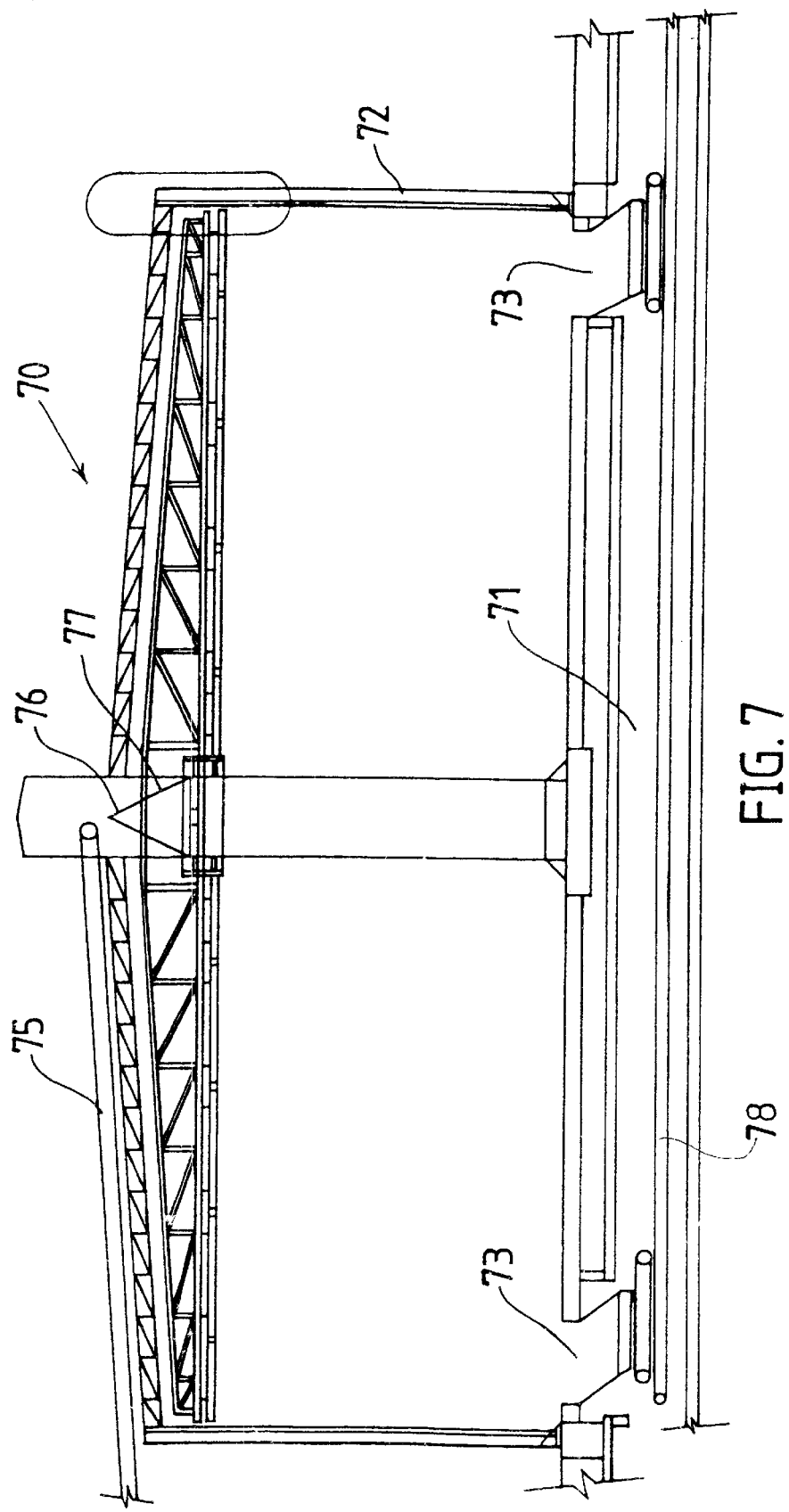
FIG. 7 corresponds to FIG. 6 but illustrates a further discharge arrangement.

The apparatus 70 illustrated in FIG. 7 is a variation on the apparatus 10 of FIG. 1. In this form a reclaim tunnel 71 extends across the base of the container 72 so as to be fed gravitationally from opposed peripheral reclaim chambers 73. As in the earlier embodiments feed is introduced axially from an inload conveyor 75 which dumps onto the apex 76 of the distribution cone 77 for even distribution thereabout. A conveyor 78 is supported in the tunnel 71 for transferring material fed through the chambers for discharge as required.

In use, in each of the above storage apparatus the feed distributed about the distribution cone will tend to pile up around the central column. However rotation of the rotary scraper in one direction will engage the scraper blades with the sloped face of the piled material and feed it outward until the sloped face is levelled. The rotary scraper is then raised to feed any further material supplied about the column toward walls of the container until the container is filled to the uppermost level of the rotary scraper.

When discharging material, gravity feed will initiate feed material to the central reclaiming station or the peripheral reclaiming station or stations. The material which remains, either against the walls in the case of a central discharge, or about the column in case of peripheral discharge can then be fed toward the respective reclaiming station by lowering the rotary scraper to engage the top of the remaining material and rotating it in the reverse direction to feed material inward to the column for discharge, or in the same direction for feeding material to peripheral discharge stations. The rotary scraper may be lowered to a position adjacent the floor so that practically all material is discharged.

Figure 8:
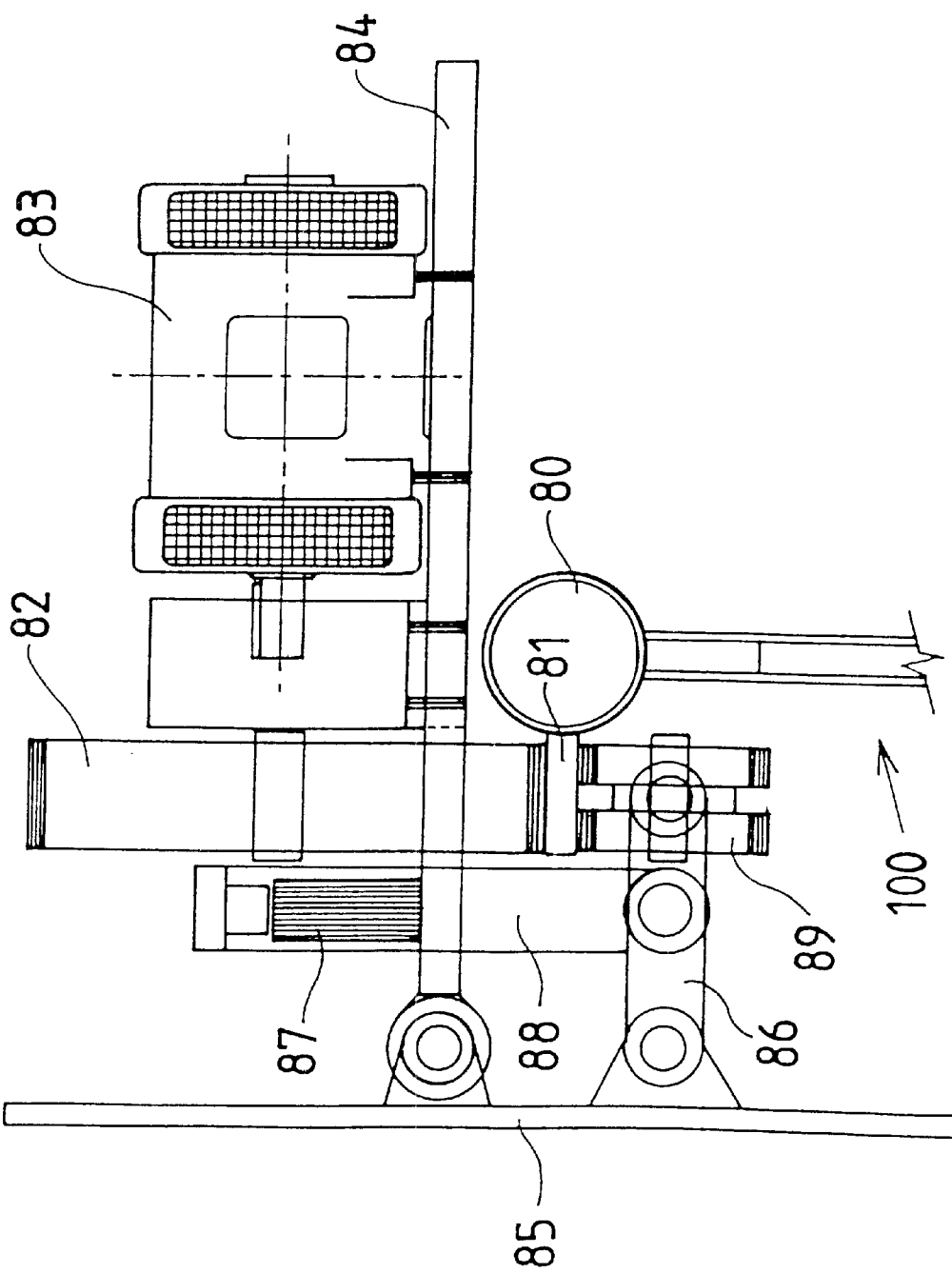
FIG. 8 diagrammatically illustrates one form of friction drive for rotating a rotary scraper.
Figure 9:
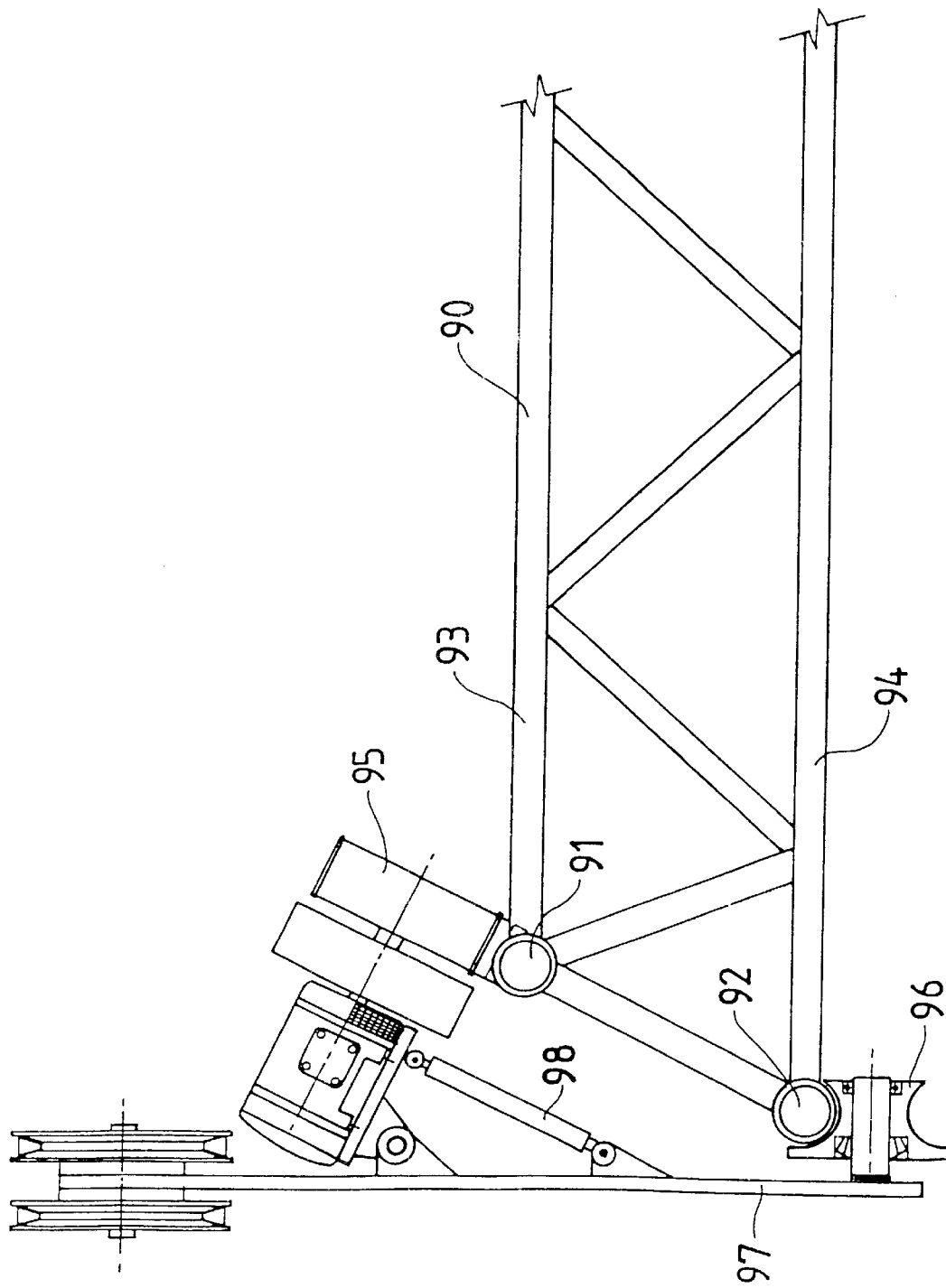
FIG. 9 diagrammatically. illustrates an alternate form of friction drive.

FIGS. 8 and 9 show alternate friction drives for peripherally driving the rotary scraper 100. In FIG. 8, the top annular chord 80 of the rotary scraper 100 is provided with a drive flange extending thereabout. A reversible friction drive wheel 82 is engaged with the flange 81 for rotating the rotary scraper 100.

The wheel 82 is driven from a motor 83 carried by a pivot bracket 84 mounted on a slide plate 85 moveable along one of the peripheral guide post assemblies. The slide plate 85 also carries the lower reaction wheel 89 on a further pivot bracket 86 which may be pivoted upwards by a selectively operable ram 87 and linkage 88 to clamp the flange 81 between the friction wheel 82 and the reaction wheel 89 so as to regulate the driving force transferred to the rotary scraper. Thus the rotary scraper 16 may stall if undue loads are applied thereto such as by forcing the scraper too deeply into a pile of material to be levelled, without damaging the motor or drive.

In the arrangement illustrated in FIG. 9, each radial truss 90 from which the scraper blades are suspended carries a round-section ring 91, 92 at the and of its upper and lower chords 93, 94. A friction driving wheel 95 engages a flange mounted on the top ring 91 and a reaction wheel 96 supports the lower ring 92. The reaction wheel is supported directly on the slide 97 while the drive wheel 95 extends, from a motor/gearbox assembly supported pivotally from the slide 97 and adjustably by the selectively operable ram 98 which is used to regulate the driving force applied to the rotary scraper as described above.

Figure 10:
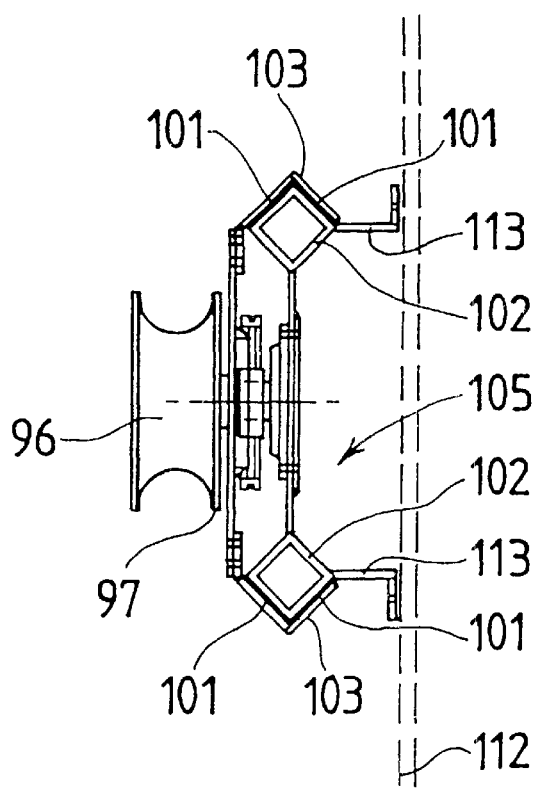
FIGS. 10 and 11 illustrate the rotary scraper support and slide arrangement in plan and side views respectively.
Figure 11:
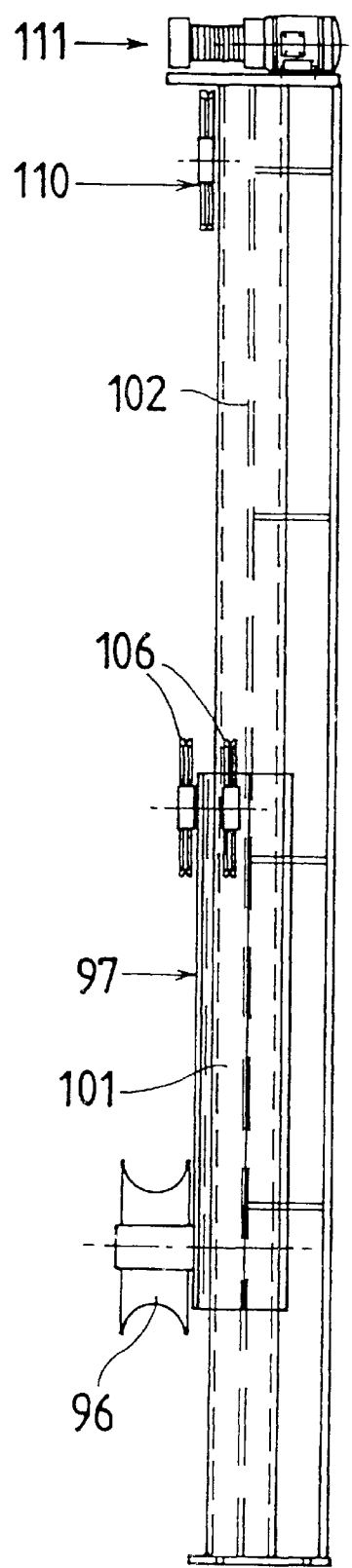

The slide 97 as illustrated in FIG. 10 has opposed vertically extended angle rails 103 which engage captively through slide blocks 101 about the diagonally arranged square-section rails 102 which form the vertical chords of a composite post assembly 105. Opposed pulley wheels 106 supported at the top of the slide 97 enable the slides to be raised and lowered by hoist cables, not shown, which extend between the wheels 106 on the slide 97 and the wheels 110 supported at the top of the post 105 and driven by an electric winching arrangement 111 for raising and lowering the slide. The vertical rails 102 are connected to the sidewall, shown dotted at 112, through stand-off mounting brackets 113.

The winches used to raise and lower the rotary scraper are preferably positioned atop the guide posts and spaced evenly about the periphery of the container. Additional winches may be provided intermediate the guide posts if desired and such as may be required for very large diameter containers where there may be a significant span between adjacent posts. Alternatively multi-stage pneumatic rams or the likes may be used as the means to raise and lower the rotary scraper.

From the above it will be seen that the overall height of the container is relatively low and this facilitates filling of the container. Furthermore the use of a spreader enables the container to be filled to capacity and completely emptied, thus effectively using the space for storage. In addition all processing is achieved without the need for supervised machinery such as front end loaders.

Figure 12:
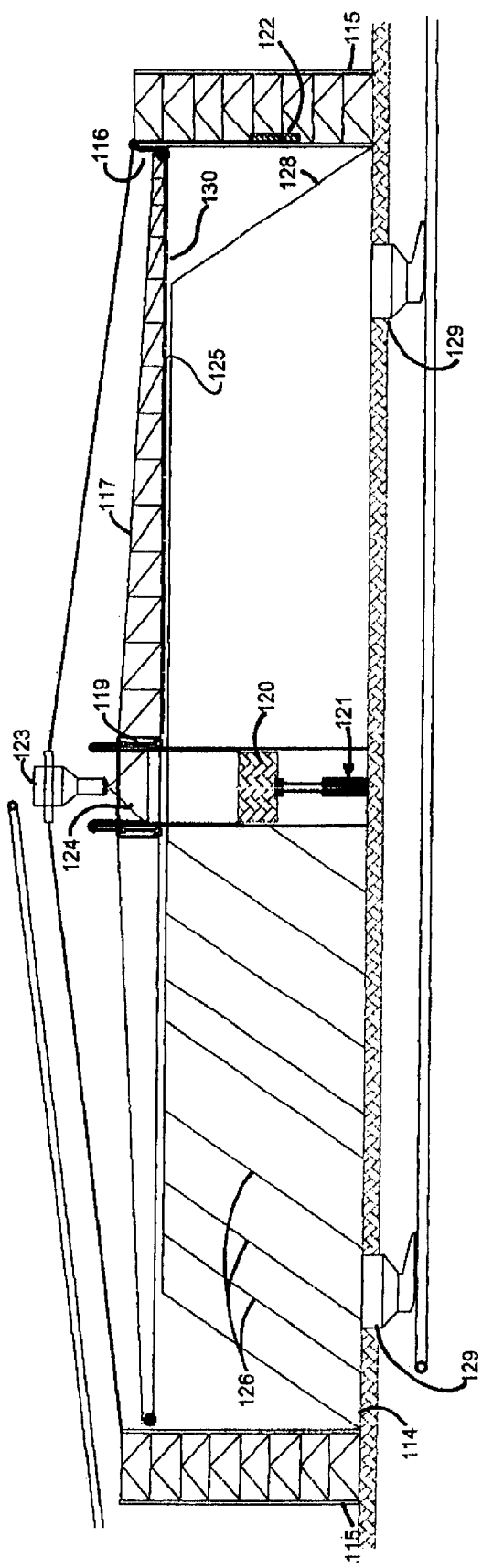
FIG. 12 shows a sectional view of the open stockpile and illustrates the support of the leveling/reclaim apparatus by sheaved counterweight systems which may apply at either the perimeter only or for application at larger installations at both the perimeter and the center.
Figure 13:
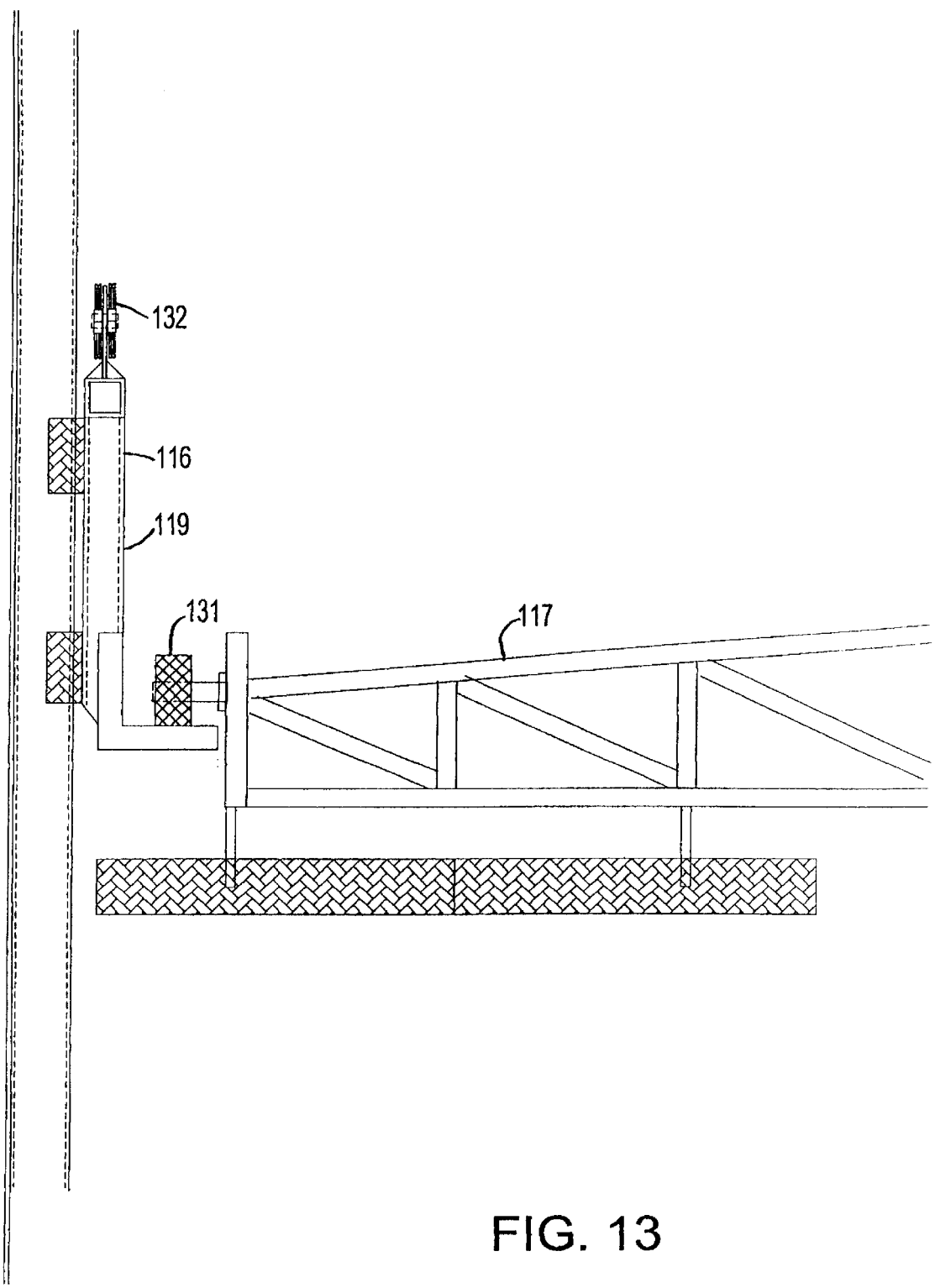
FIG. 13 is a sectional view that illustrates the manner in which the leveling and reclaim apparatus is supported by the outer annular perimeter truss. The truss is slideably attached to the reaction column. The leveling/reclaim apparatus is shown with a series of perimeter support rollers Support at the center would be similar with an inner annular truss arrangement.
Figure 14:
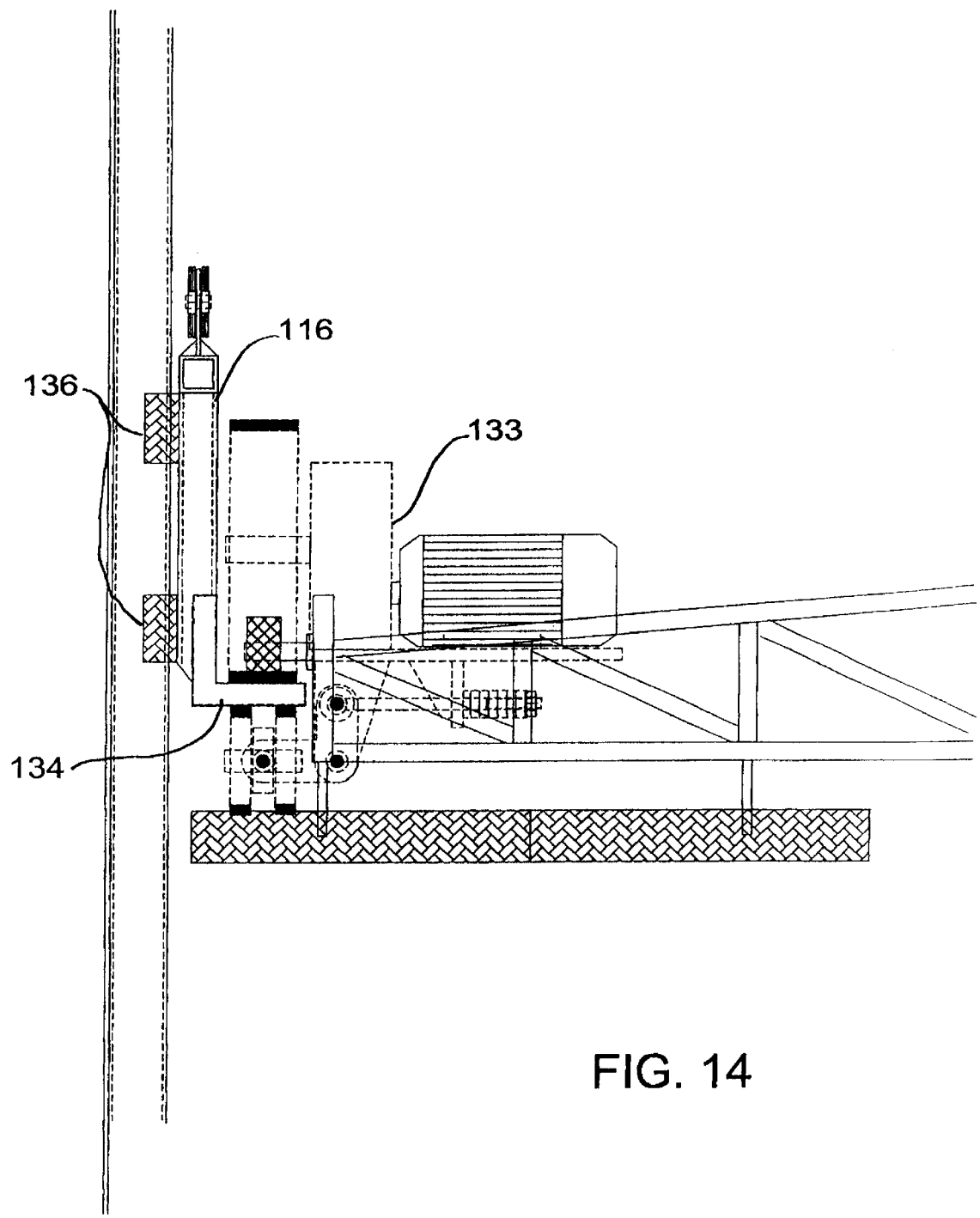
FIG. 14 illustrates the friction drive assembly positioned on the leveling/reclaim apparatus, drive assembly is shown dotted.

The open stockpile management system illustrated in FIGS. 12–14 is in the form of a circular area 114 having a series of equispaced perimeter support structures 115 that provide support to the outer circular support truss 116 upon and in which the leveling/reclaiming apparatus 117 is supported and rotates.

A central support and distribution column 118 is used to support an inner circular truss 119 in which the leveling/reclaiming apparatus 117 is also supported. The inner and outer circular trusses 119 and 116 are counterweighted by weights 120 and 122 to provide equality of mass between the combined weight of the trusses and the leveling/reclaim apparatus and the counterweights.

Height adjustment required during operation of the stockpile management system, is provided by a central hydraulic ram 121 positioned underneath counterweight 120 Material is deposited in conventional manner by a conveyor system depositing materials via a centrally positioned chute 123 over distribution cone 124. Rotation of the leveling /reclaim apparatus will engage a series of scraper blades 125 positioned to move material outward. The apparatus 117 may during fill operations be positioned in its topmost location. Continual filling may be with material of consistent quality and grade but could also be with varying grades which would result in the stockpile having layers of varying grades 126.

Outward scraping blades 125 will only promote the material outward to the point of intersection between the top level of the pile 127 and the top of the angle of repose 128 and produce the frustum shaped pile embraced by the base area 114 and the angle of repose 128. Reclaim pockets 129 are located on the center-line and positioned in the base 114 coincident with a point vertically below the top of the angle of repose 128. Inward grading blades 130 ensure that with operation of the management system. by rotation of the apparatus 117 the outer material will progressively be reclaimed.

With reference to FIG. 13, rotation of the leveling/reclaim apparatus is by means of a series of rollers 131 fitted at even spaces to the perimeter of the apparatus 117. The rollers are supported in the inner and outer circular trusses 119 and 116. The circular trusses 119 and 116 are supported by a cable arrangement via sheave sets 132. With reference to FIG. 14, rotational drive power is provided with a motor/gearbox arrangement 133 that provides friction drive power to the friction face 134 of outer circular truss 116.

Combined reaction and guiding attachments 136 transfer drive reaction forces to towers 115 and provide guides for vertical travel.

Thus it will be seen that this embodiment enables large volumes of granular bulk solids material to be readily managed in an automated fashion in respect of the stockpiling and-reclaiming of these materials.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A storage apparatus suitable for storing bulk material, comprising:

a storage container having a round perimeter wall, said round perimeter wall having an axis;

a material inlet at a top of said storage container;

a material outlet at a base of said storage container;

a rotary scraper rotatable about said axis, said rotary scraper being capable of vertical motion, said rotary scraper including a plurality of radial arms which extend from an inner annular hub to an outer annular rim;

a plurality of vertical adjustable mountings being disposed on an inner side of said round perimeter wall, each said vertical adjustable mounting moving vertically in tandem with each other to raise or lower said rotary scraper; and at least one drive apparatus being used to rotate said rotary scraper, a single said drive apparatus being mounted on at least one of said plurality of vertically adjustable mountings.

2. The storage apparatus suitable for storing bulk material of claim 1, wherein;

said rotary scraper capable of being rotated in either a clockwise or counter clockwise direction.

3. The storage apparatus suitable for storing bulk material of claim 1 wherein:

said rotary scraper having non-radially oriented blades thereon which engage the upper surface of the bulk material.

4. The storage apparatus suitable for storing bulk material of claim 1 wherein;

said storage container being filled by introducing material at said axis thereof.

5. The storage apparatus suitable for storing bulk material of claim 1 wherein;

said rotary scraper having blades which are reversible for controlling the direction of spreading the bulk material.

6. The storage apparatus suitable for storing bulk material of claim 1 wherein:

said drive apparatus being a friction drive.

7. The storage apparatus suitable for storing bulk material of claim 6, further comprising:

said friction drive including a driving wheel and an opposing reaction wheel, said friction drive supporting said outer ring frame against non driving loads imposed by said driving wheel.

8. The storage apparatus suitable for storing bulk material of claim 1, further comprising:

a central column structure through which the bulk material may be introduced and discharged from said storage container.

9. The storage apparatus suitable for storing bulk material of claim 8, further comprising:

an auger being disposed in said central column structure for ensuring the free flowability of bulk material from said storage container.

10. An apparatus for storing or blending bulk materials comprising:

a material inlet disposed on a top of the bulk materials;

at least one material outlet at a base of the bulk materials;

a rotary scraper rotatable about an axis, said rotary scraper being capable of vertical motion, said rotary scraper including a plurality of radial arms which extend from an inner annular hub to an outer annular rim;

a plurality of vertical adjustable mountings being disposed on a plurality of support towers, each said vertical adjustable mounting moving vertically in tandem with each other to raise or lower said rotary scraper;

at least one drive apparatus being used to rotate said rotary scraper, a single said drive apparatus being mounted on at least one of said plurality of vertically adjustable mountings.

11. An apparatus for storing or blending bulk materials of claim 10, further comprising:

a central hydraulic ram positioned underneath a counterweight, said central hydraulic ram and said counterweight moving in tandem with said plurality vertical adjustable mountings.

12. The storage apparatus suitable for storing bulk material of claim 10, wherein;

said rotary scraper capable of being rotated in either a clockwise or counter clockwise direction.

13. The storage apparatus suitable for storing bulk material of claim 10 wherein:

said rotary scraper having non-radially oriented blades thereon which engage the upper surface of the bulk material.

14. The storage apparatus suitable for storing bulk material of claim 10 wherein;

said rotary scraper having blades which are reversible for controlling the direction of spreading the bulk material.

15. The storage apparatus suitable for storing bulk material of claim 10 wherein:

said drive apparatus being a friction drive.

16. The storage apparatus suitable for storing bulk material of claim 15, further comprising:

said friction drive including a driving wheel and an opposing reaction wheel, said friction drive supporting said outer ring frame against non driving loads imposed by said driving wheel.

* * * * *